United States Patent [19]

Kuga et al.

[11] Patent Number: 4,584,245
[45] Date of Patent: Apr. 22, 1986

[54] LAMINATED SAFETY GLASS

[75] Inventors: Kazuhiko Kuga; Hiroshi Washita; Hiroyuki Watanabe; Kohji Kurita; Takeshi Harada, all of Yokohama, Japan

[73] Assignee: Asahi Glass Company Ltd., Tokyo, Japan

[21] Appl. No.: 499,790

[22] Filed: May 31, 1983

[30] Foreign Application Priority Data

Jun. 8, 1982 [JP] Japan .................................. 57-96952
Jun. 8, 1982 [JP] Japan .................................. 57-96953
Jun. 25, 1982 [JP] Japan .................................. 57-108473
Aug. 27, 1982 [JP] Japan .................................. 57-147830

[51] Int. Cl.⁴ ......................... B32B 27/40; B32B 7/02
[52] U.S. Cl. .................................... 428/409; 428/420; 428/423.3; 428/425.6; 428/447; 428/426
[58] Field of Search ................ 428/423.3, 425.6, 409, 428/447, 426, 420; 427/302; 156/331.1

[56] References Cited

U.S. PATENT DOCUMENTS

| | | | |
|---|---|---|---|
| 3,627,722 | 12/1971 | Seiter | 428/425.6 |
| 3,871,908 | 3/1975 | Spoor | 428/425.6 |
| 3,878,036 | 4/1975 | Chang | 428/425.6 |
| 4,039,720 | 8/1977 | Cherenko | 428/425.6 |
| 4,099,638 | 7/1978 | Tatsumi | 428/425.6 |
| 4,174,240 | 11/1979 | Müller | 428/425.6 |
| 4,447,488 | 5/1984 | Simm | 428/423.3 |

FOREIGN PATENT DOCUMENTS 0122355 9/1979 Japan .............................. 428/425.6
1576394 10/1980 United Kingdom .

Primary Examiner—Ellis P. Robinson
Attorney, Agent, or Firm—Oblon, Fisher, Spivak, McClelland & Maier

[57] ABSTRACT

Transparent or translucent laminated safety glass having an at least two layered structure comprising a synthetic resin layer having an exposed surface and a hard substrate layer wherein the exposed surface of the synthetic resin layer has a cross-linked structure of cross-linkable groups introduced and cross-linked in said surface.

13 Claims, 8 Drawing Figures

LAMINATED SAFETY GLASS

The present invention relates to laminated safety glass having an at least two layered structure comprising a synthetic resin layer having an exposed surface and a hard substrate layer. More particularly, the present invention relates to laminated safety glass comprising a synthetic resin layer having an exposed surface having improved surface properties.

A laminated sheet composed of a glass sheet and a synthetic resin sheet is well-known as laminated safety glass. For instance, a laminated sheet having a three-layered structure of glass-polyvinyl butyral glass is widely used as safety glass for automobiles. The synthetic resin layer interposed between the glass sheets is referred to as an intermediate film, and for this purpose, various synthetic resins such as polyvinyl butyral, polyurethane and the like are used or proposed to be used. On the other hand, among various types of laminated safety glass composed of glass and a synthetic resin, a laminated sheet with its synthetic resin layer exposed, e.g. a laminated sheet having glass on one side and a synthetic resin on the other side, such as glass-synthetic resin or glass-synthetic resin-glass-synthetic resin, has become attractive as a prospective material for safety glass for automobiles. This laminated safety glass is believed to be safer than the conventional laminated safety glass with both sides made of glass. For instance, if this laminated safety glass is used as front glass of an automobile with its synthetic resin surface facing inside, the synthetic resin surface is believed to protect an occupant such as a driver from being injured when he hits the front glass and even when the glass is shattered, the synthetic resin layer is believed to prevent or minimize the scattering of the glass fragments into the inside of the automobile. Such a laminated safety glass having a glass surface on one side and a synthetic resin surface on the other side will be hereinafter referred to as "resin-laminated glass".

The resin-laminated glass is disclosed, for instance, U.S. Pat. Nos. 3,881,043, 3,806,387, 3,979,548 and 3,808,077, U.K. Pat. Nos. 1,401,986 and 1,576,394 and German Pat. No. 2,240,580. As disclosed in these prior art references, the synthetic resin layer is usually made of polyurethane. Further, it is well known to use polyurethane as an intermediate film in two-ply glass. The polyurethane includes so-called thermoplastic polyurethane and thermosetting polyurethane. The thermoplastic polyurethane is a linear polymer and is usually prepared by reacting a diol having a high molecular weight, a chain extender and a diisocyanate compound, whereas the thermosetting polyurethane is a cross-linked polymer and is prepared, for instance, by reacting a diol having a high molecular weight, a cross-linking agent and a diisocyanate compound. The synthetic resin layer is required to be firmly bonded to glass. When a thermosetting polyurethane is used as the synthetic resin layer, however, there is a problem that the thermosetting polyurethane can not firmly be bonded to glass. On the other hand, the thermoplastic polyurethane is capable of being firmly bonded to glass, but so long as it is used as a synthetic resin layer in the resin-laminated glass, the other surface is exposed and the exposed surface has certain problems in its properties. Namely, the thermoplastic polyurethane does not have adequate weather resistance and is susceptible to an influence of a solvent. These problems are discussed in detail in U.K. Pat. No. 1,576,394.

The U.K. Patent discloses an invention whereby the abovementioned problems are solved by providing a synthetic resin layer comprising two polyurethane layers, namely the surface layer is made of a thermosetting polyurethane and the layer bonded to glass is made of a thermoplastic polyurethane. These two types of polyurethanes are capable of being firmly bonded to each other. Accordingly, by this invention, it is possible to solve both problems relating to the bonding of the synthetic resin layer to glass and the surface properties. However, this invention does not necessarily solve all the problems. Firstly, in this invention, it is necessary to prepare a sheet (which is referred to as a pre-formed polymeric sheet) comprising two different polyurethanes, thus requiring relatively complicated process steps. For instance, as described in the U.K. Patent, it is required to employ a method wherein a mixture of liquid monomers for one polyurethane is cast on a sheet of the other polyurethane to form unitary structure of a method in which one polyurethane is dissolved in a solvent and the solution thereby obtained is coated on the surface of the other polyurethane. The second problem resides in that the thermosetting polyurethane loses plasticity once it is hardened. First of all, there is a restriction in the process for forming a sheet or film of the thermosetting polyurethane (the casting method for hardening is usually the only process), and extrusion molding, press-molding or other methods suitable for forming can not usually be employed. Accordingly, it is difficult to obtain a smooth sheet or film having a uniform thickness. Further, in the case where the material has plasticity, it is usually possible to form a flat smooth surface by pressing it with a press having a flat surface, but in the case of the thermosetting polyurethane, it is impossible to form such a flat surface once the plasticity has been lost. Likewise, for this reason, the thermosetting polyurethane does not have adequate adhesiveness. Thirdly, the thermosetting polyurethane is inferior to the thermoplastic polyurethane in the physical properties required for the resin-laminated glass, such as penetration resistance or impact resistance.

In the above-mentioned prior art references, such various problems are not yet solved. Apart from the question of the surface properties, a thermoplastic resin, particularly a polyurethane thermoplastic resin, is believed to be most suitable for use as the synthetic resin layer for the resin-laminated glass. However, it is not necessarily required to form the entire synthetic resin layer with a thermoplastic resin, and a thermosetting resin may be used e.g. for bonding the layers in a multilayered structure of a synthetic resin layer or for bonding a synthetic resin layer to a hard substrate where the hard substrate is made of organic glass. Even in such a case, the thermosetting resin layer to be present should preferably be thin and the major portion of the synthetic resin layer, especially the major portion including the surface layer constituting the exposed surface, should preferably be made of a thermoplastic resin. Such a thermoplastic resin layer having a single or multi-layered structure which may include a thermosetting resin layer, will be hereinafter referred to simply as a synthetic resin layer.

The present inventors have found that in the above-mentioned laminated safety glass having an at least two layered structure comprising a synthetic resin layer and a hard substrate layer such as a glass sheet, it is possible to obtain superior surface properties by providing a cross-linked structure of cross-linkable functional groups in the exposed surface of the synthetic resin layer.

Thus, the present invention provides transparent or translucent laminated safety glass having an at least two layered structure comprising a synthetic resin layer having an exposed surface and a hard substrate layer, wherein the exposed surface of the synthetic resin layer has a cross-linked structure of cross-linkable groups introduced and cross-linked in said surface.

Now, the present invention will be described in detail with reference to the preferred embodiments.

In the accompanying drawings, FIGS. 1 to 4 are cross sectional views illustrating various embodiments of the laminated safety glass of the present invention.

FIG. 5 illustrates the preparation of a two layered structure comprising a synthetic resin layer and a hard substrate.

FIG. 6 illustrates the preparation of a three layered structure comprising two synthetic resin layers and a hard substrate.

FIG. 7 illustrates the preparation of a three layered structure comprising two synthetic resin layers and a hard substrate.

FIG. 8 illustrates the preparation of a four layered structure comprising a synthetic resin layer and a hard substrate having a three layered structure.

Figure 1:
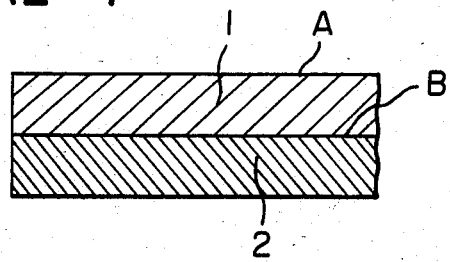
FIG. 1 illustrates a two layered structure comprising a synthetic resin layer and a hard substrate.

The cross-linkable functional groups (hereinafter referred to simply as "cross-linkable groups") are introduced into a synthetic resin surface which constitutes or will constitute the exposed surface of the synthetic resin layer. The timing of the introduction may be after the laminated safety glass has been assembled or at any optional stage prior to the assembling. The introduction into a surface is meant for introducing the cross-linking groups into an exposed surface of the synthetic resin or into a surface which has been preformed to constitute an exposed surface of the synthetic resin. The surface into which the cross-linking groups have been introduced, may be subjected to a further processing or modification including a secondary processing such as surface smoothing treatment during the heat pressing operation which will be described hereinafter. However, if the synthetic resin contains cross-linkable groups prior to the fabrication into a sheet or film (in such a case, the cross-linkable groups are usually distributed throughout the entire synthetic resin layer), such cross-linkable groups are not regarded as the cross-linkable groups introduced into a surface. However, the synthetic resin layer into which the cross-linkable groups are to be introduced, may already contain in its surface or in its internal portion, cross-linkable groups which may be the same as or different from the cross-linkable groups to be introduced.

The laminated safety glass of this invention has a cross-linked structure of cross-linkable groups introduced in the exposed surface of its synthetic resin layer. The exposed surface having such a cross-linked structure has superior surface properties such as weather resistance and solvent resistance. Besides, since this cross-linked structure is located at the surface, it does not give substantial effects to the nature of the synthetic resin other than the surface portion. Accordingly, it is possible to select a synthetic resin having the most suitable properties other than the surface property. For instance, it is possible to employ a synthetic resin such as a polyurethane thermoplastic resin which is most suitable for a laminated safety glass apart from the surface property.

As the cross-linkable groups, there may be used various cross-linkable groups which are cross-linkable by heat, light, moisture or a chemical substance. It is preferred to use functional groups cross-linkable by the action other than heat, and particularly preferred are functional groups cross-linkable by light or moisture. The reason is that for the fabrication of laminated safety glass, a heating step is required not infrequently and if functional groups cross-linkable by heat are present, it is likely that unnecessary cross-linking takes place during the heating step. For instance, in many cases, laminated safety glass is fabricated by laminating a synthetic resin sheet or film with a hard substrate by means of heat pressing or any other heating means for lamination. Further, in a case where a multi-layered synthetic resin sheet or film is used, it is quite common to employ a method involving a heating step for the preparation of such a laminated heat or film. In such cases, it is common to preliminarily introduce cross-linkable groups into such a synthetic resin sheet or film and then employ the sheet or film for the preparation of laminated safety glass or a synthetic resin laminate. If the cross-linkable groups are highly sensitive to heat and susceptible to cross-linking by heat, there will be a possible disadvantage such that the cross-linking takes place during the press heating whereby the smoothness of the surface will be impaired. Accordingly, the cross-linkable groups are preferably functional groups cross-linkable by the action other than heat, particularly functional groups cross-linkable by light or moisture. However, in a case where a finished synthetic resin surface of an already fabricated laminated safety glass is to be treated, the cross-linkable groups may be functional groups cross-linkable by heat. The introduced functional groups are then cross-linked by a suitable means to induce the cross-linking. For instance, in the case of the functional groups cross-linkable by light, the cross-linking is conducted by light such as ultra-violet ray, and in the case of the functional groups cross-linkable by moisture, the cross-linking is carried out by water in a liquid state or a vapor state. For instance, in the introduction and cross-linking of alkoxysilyl groups as an example of functional groups cross-linkable by moisture, firstly the surface which constitutes or will constitute an exposed surface of a synthetic resin layer, is made of a synthetic resin having active groups such as carboxylic groups, for instance, a polyurethane thermoplastic resin containing carboxylic groups, as mentioned hereinafter, and then a compound having a group linkable to such an active group (hereinafter referred to as a "linkable group") and an alkoxysilyl group as a moisture-cross-linkable group, is, by itself or in a form of its solution, coated thereon and reacted, whereby the alkoxysilyl group is introduced into the surface of the synthetic resin. Then, this surface is moistened (for example, by applying water thereto or by placing it in an air containing moisture) to hydrolyze and convert the alkoxysilyl group to a silanol group. This silanol group is then permitted to naturally undergo condensation by dehydration, or positively dehydrated to form a cross-linkage.

In FIGS. 1 to 4, various embodiments of the laminated safety glass of the present invention are shown in their cross sections.

Figure 2:
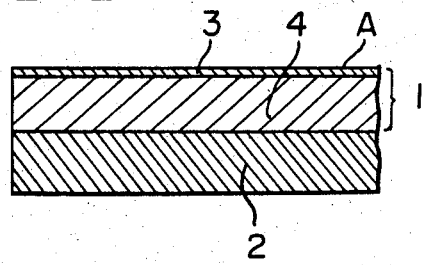
FIG. 2 illustrates a three layered structure comprising two synthetic resin layers and a hard substrate.
Figure 3:
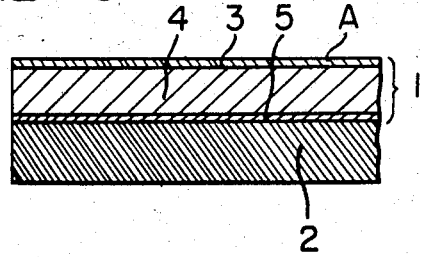
FIG. 3 illustrates a four layered structure comprising three synthetic resin layers and a hard substrate.
Figure 4:
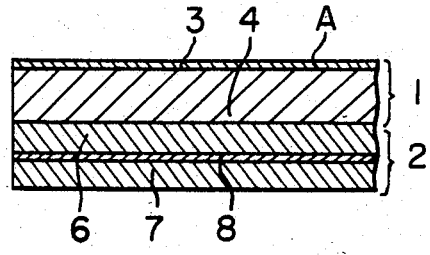
FIG. 4 illustrates a five layered structure comprising two synthetic resin layers and a hard substrate having a three layered structure.

FIG. 1 is a cross sectional view of laminated safety glass having a two layered structure comprising a synthetic resin layer 1 and a hard substrate layer 2 made of e.g. inorganic glass (hereinafter referred to simply as "glass"). The exposed surface A of the synthetic resin layer 1 has a cross-linked structure of cross-linkable groups introduced in the above-mentioned manner, whereas the other surface B is bonded to the hard substrate 2. FIG. 2 is a cross sectional view of laminated safety glass wherein the synthetic resin layer 1 has a two layered structure. For instance, the synthetic resin layer 3 having an exposed surface A is a layer made of a polyurethane thermoplastic resin having active groups such as carboxylic groups, as mentioned in hereinafter whereas the inner synthetic resin layer 4 is made of a usual polyurethane thermoplastic resin. FIG. 3 illustrates laminated safety glass similar to the one shown in FIG. 2, but wherein the synthetic resin layer has a three layered structure, and between the inner synthetic resin layer 4 as shown in FIG. 2 and the hard substrate layer 2, there is provided a third synthetic resin layer 5 having strong bonding force to both layers. In this case, if the hard substrate layer 2 is made of organic glass, the third synthetic resin layer 5 may be a layer of a thermosetting resin. FIG. 4 illustrates laminated safety glass similar to the one shown in FIG. 2, but wherein the hard substrate layer 2 has a three layered structure, and this hard substrate is composed of two glass layers 6 and 7 and an intermediate film 8 such as a butyral film interposed between the glass layers.

In the present invention, the hard substrate layer is made of a sheet material having greater hardness than the synthetic resin, such as a sheet of glass (i.e. inorganic glass) or a sheet of polycarbonate, polymethylmethacrylate or other organic glass. The third substrate may be of a single layered structure or a multi-layered structure as mentioned above. In the case of the multi-layered structure, the surface to which the synthetic resin is bonded e.g. by heat pressing and the exposed exterior surface are made of a hard material, but the intermediate layer interposed between the two hard material layers may be made of a soft material such as a butyral resin. In the case of a glass sheet, it may be the one strengthened by e.g. air-cooling or chemical strengthening. Further, the glass sheet may be colored or may have a thin film such as a heat ray reflecting film. In the case of an organic glass sheet, it may be the one subjected to certain treatment such as stretching treatment, or it may have a thin layer such as a hard coating layer. Further, the organic glass sheet may be colored or may have certain printed design. Furthermore, it may have partially a non-transparent portion. The hard substrate is preferably transparent or translucent as a whole. It is particularly preferred that the hard substrate has superior optical properties. The overall thickness of the hard substrate is preferably at least 0.5 mm, more preferably from 1 to 50 mm. This hard substrate may be a flat sheet or may have various shapes suitable for a front window or rear window of a automobile. Further, depending upon the particular use, it may be the one having a varied thickness, such as a lens. A particularly preferred hard substrate is composed of a transparent or colored transparent glass sheet having a single or multi-layered structure.

In the present invention, the synthetic resin layer is made of a synthetic resin which is softer than the hard substrate. This synthetic resin is made of a transparent or translucent material. However, sheet or film materials per se prior to lamination may be non-transparent (for instance, because of a finely roughened surface) so long as they are able to eventually become transparent or translucent when laminated. The synthetic resin may be colored or may partially have a non-transparent portion. The synthetic resin constituting the exposed surface is preferably a thermoplastic resin. Particularly, preferred is a polyurethane thermoplastic resin, as mentioned hereinafter. As the synthetic resin which does not constitute the exposed surface, there may be used various kinds of synthetic resins. However, even when a particular synthetic resin does not constitute the exposed surface, if the physical properties of the overall synthetic resin layer depend on the particular layer, namely if the particular layer is substantially thicker than other synthetic resin layers, such a synthetic resin should preferably be a thermoplastic resin, particularly a polyurethane thermoplastic resin. In the case where the synthetic resin layer has a single layered structure, a thermoplastic resin sheet is used. In the case of the multi-layered synthetic resin layer, the synthetic resins may be used in the form of sheets or films. In the present invention, a sheet is meant for a material having a thickness at least 0.2 mm, and a film is meant for a material having a thickness of less than 0.2 mm. Accordingly, a synthetic resin layer may be formed by using e.g. a polyurethane thermoplastic resin film having active groups readily linkable to the above-mentioned linkable groups and a thick polyurethane thermoplastic resin sheet. The overall thickness of the synthetic resin layer is not critical, but preferably is at least 0.2 mm, more preferably from 0.4 to 10 mm.

In the present invention, the above-mentioned thermoplastic resin is preferably a polyurethane thermoplastic resin. Other thermoplastic resins which may be used, include a polyester resin, a butyral resin, a polydiene resin, an ethylene-vinylacetate copolymer, a polyolefin elastomer or other relatively soft thermoplastic resin or thermoplastic elastomer. However, from the viewpoints of the transparency, shock resistance, penetration resistance or other physical properties, a polyurethane thermoplastic resin is most preferred. The polyurethane thermoplastic resin is a synthetic resin containing a number of urethane groups and having thermoplasticity. This synthetic resin may contain, in addition to urethane groups, urea groups, allophanate groups, biuret groups or other groups formed by the reaction of an active hydrogen-containing group with an isocyanate group. Further, it may contain isocyanurate groups, carbodiimide groups or other groups derived from isocyanate groups. Further, it may of course contain ester groups, ether groups, carbonate groups or other groups derived from the high molecular weight polyol per se, as well as certain groups derived from compounds such as chain extenders or cross-linking agents. In the case of polyurethane which constitutes the exposed surface, in order to facilitate the introduction of functional groups cross-linkable by light or moisture, it preferably has active groups such as carboxylic acid groups or partially amino groups, which are linkable to a compound having such functional groups.

The polyurethane thermoplastic resin is basically a linear polymer obtainable by reacting a high molecular weight diol, a chain extender and a diisocyanate compound. However, it may contain a small amount of branched chains. For instance, it may be a substantially linear polymer having a small amount of branches which is obtainable by using an at least tri-functional polyol, cross-linking agent or polyisocyanate in combination with the above-mentioned bi-functional compound. In addition to the three major materials i.e. the high molecular weight diol, the chain extender and the diisocyanate compound, there may be used, if necessary, various subsidiary materials for the preparation of a polyurethane thermoplastic resin. It is usually required to use a catalyst as a subsidiary material. Depending upon the particular purpose, a cross-linking agent, a coloring agent, a stabilizer, a ultra-violet absorption agent, a flame retardant or other additives may be used as subsidiary materials.

As the high molecular weight diol, there may be used a polyesterdiol, a polyether diol, a polyether ester diol, a polycarbonate diol or other high molecular weight diols. Particularly preferred is a polyester diol obtained by the reaction of a dihydric alcohol with a divalent carboxylic acid compound, or a polyester diol obtained by ring-opening polymerization of a cyclic ester compound. For instance, poly(1,4-butyleneadipate), poly(ethyleneadipate), poly(1,4-butyleneazelate) or poly($\epsilon$-caprolactone) may be used. Further, in some cases, it is preferred to use a polyether diol obtained by adding an epoxide such as alkylene oxide or other cyclic ether having an at least 4-membered ring structure to water, a dihydric alcohol, a dihydric phenol or other initiator, or a polycarbonate diol obtained by reaction of an aliphatic alicyclic diol with phosgene or by diester exchange reaction of such diol with a dialkylcarbonate. These high molecular weight diols are preferably liquid at a normal temperature or have a low melting point so that they can be converted to liquid at the time of the reaction. Their molecular weight is not critical, but is preferably from 600 to 8000, more preferably from 800 to 4000.

The chain extender is a divalent compound having a relatively low molecular weight, such as a diol, a diamine, a dihydric alkanolamine or other compounds having two hydroxyl groups or amino groups. Its molecular weight is not critical, but is preferably not more than 400, more preferably not more than 200. As the diol, their may be used a dihydric alcohol, a polyester diol or a polyether diol. Particularly preferred is a dihydric alcohol having from 2 to 6 carbon atoms. As the diamine, an aliphatic, alicyclic, aromatic or other diamine may be used. As the alkanolamine, a dihydric alkanolamine such as an N-alkyldiethanolamine may be used. In the combination of the high molecular weight diol with the chain extender, it is possible to incorporate other divalent compounds such as diols having a molecular weight inbetween them. Each of the high molecular weight diol and the chain extender may be a mixture of two or more respective compounds.

As the diisocyanate compound, there may be used aliphatic, alicyclic, aromatic or other diisocyanates, or modified compounds thereof. They may be used alone or in combination as a mixture of two or more different kinds. An isocyanate group directly bonded to an aromatic ring is likely to lead to yellowing of the polyurethane thereby obtained. Therefore, it is preferred to use a diisocyanate having no such an isocyanate group, i.e. a diisocyanate commonly called a non-yellowing type. For example, preferred diisocyanates include hexamethylene diisocyanate, methylene bis(cyclohexylisocyanate), cyclohexylmethane diisocyanate, isophorone diisocyanate, xylylene diisocyanate and modified diisocyanates obtained by modifying these diisocyanates by treating them with various compounds.

The polyurethane thermoplastic resins may be prepared from the above-mentioned materials by means of a one-shot method, a prepolymer method, a modified prepolymer method or various other methods. By these methods, they may be formed directly into sheets of films, or they may be formed into sheets or films from polyurethane solutions or powdery or granular polyurethanes thereby obtained. For instance, they may be formed into sheets or films by means of a casting method, an extrusion molding method, an injection molding method, a pressing method or other methods. In the case where a multi-layered polyurethane thermoplastic resin, a laminate of a polyurethane thermoplastic resin with other synthetic resin, a laminate obtained by laminating the above-mentioned sheets or films by fusion bonding, press bonding or adhering, or a laminate prepared by a multi-layer extrusion molding method or casting method, may be employed.

The exposed surface of the laminated safety glass of the present invention is prefeably made of a synthetic resin to which functional groups cross-linkable by light or moisture can readily be introduced. Namely, in FIG. 1, the entire synthetic resin layer 1 and in each of FIGS. 2 to 4, at least the synthetic resin layer 3 having the exposed surface should preferably made of such a synthetic resin. In the case of a polyurethane thermoplastic resin as such a synthetic resin, the polyurethane thermoplastic resin should preferably have carboxylic acid groups, partially amino groups or other highly reactive groups. Even without such groups, it is possible to utilize active groups such as urethane groups which the resin contains in itself. However, since the functional groups cross-linkable by light or moisture can readily be introduced, it is preferred that such highly reactive groups should be introduced during the preparation of the polyurethane. In the case of carboxylic acid groups as the highly reactive groups, it is possible to prepare a polyurethane containing carboxylic acid groups by using main materials containing carboxylic acid groups such as a high molecular weight diol containing carboxylic acid groups and a chain extender having carboxylic acid groups, or a subsidiary material such as a cross-linking agent having carboxylic acid groups. These compounds having carboxylic acid groups may be substituted entirely for the above-mentioned high molecular weight diol or the chain extender, but is usually employed in combination therewith. For instance, a carboxylic acid having a hydroxyl group such as dimethylol propionic acid useful as the chain extender having a carboxylic acid group is preferably used in combination with a dihydric alcohol as a common chain extender. Further, in the case where the carboxylic acid groups are likely to adversely affect the reaction for the preparation of polyurethane or they are likely to undergo reaction, it is possible to employ a method wherein a compound having a group convertible to a carboxylic acid group is used for the preparation of the polyurethane, and subsequently that group is converted to a carboxylic acid group.

The laminated safety glass is prepared by laminating preferably a thermoplastic resin such as a polyurethane thermoplastic resin with a hard substrate such as a glass sheet by means of heat-press bonding, fusion bonding, adhering or other methods. In the case where the laminated safety glass has a multi-layered structure having at least three layers, the respective layers may simultaneously or successively be laminated. Especially when two or more synthetic resin layers are to be provided, it is preferred to use their laminate which has been preliminarily prepared. Various methods for lamination may be employed for the lamination to prepare a laminate of synthetic resins or a multilayered hard substrate. For the lamination of a thermoplastic resin with a hard substrate, heat-press bonding is most suitable. The lamination of the synthetic resin with the hard substrate usually constitute the final lamination step in the process for the preparation of laminated safety glass. However, it is possible to apply further lamination to prepare laminated safety glass having a layered structure having three or more layers. For instance, onto the upper surface of the two layered laminated safety glass as shown in FIG. 1, a further thermoplastic resin sheet or film may be laminated to obtain a three layered laminated safety glass as shown in FIG. 2.

The heat-press bonding in the above-mentioned lamination is usually conducted by a combination of a preliminarily press bonding step wherein a thermoplastic resin and a hard substrate (hereinafter referred to as a "laminated assembly") is deaerated under reduced pressure at a normal temperature or under heating to a temperature not higher than 100° C. to remove e.g. an air present between the resin and the substrate, and a main press bonding step wherein the laminated assembly is subjected to heat-press bonding under heat and pressure. More specifically, the heat-bonding is carried out, for instance, by placing one or more thermoplastic resin sheets or films on a hard substrate, placing thereon a mold material having a smooth surface such as a glass sheet, a rubber sheet, a plastic sheet or a metal sheet treated with a releasing agent, putting the laminated assembly thus obtained, in a preliminary press-bonding envelope made of rubber, deaerating the press bonding envelope to carry out the preliminary bonding, then putting the preliminarily press-bonded laminate into a autoclave after removing or without removing the mold material and applying pressure and heating to carry out the main press-bonding. The preliminary press-bonding is usually carried out by reducing the pressure in the preliminarily press-bonding envelope to a level of at most about 700 mmHg, e.g. from 200 to 650 mmHg, and then heating to a temperature of a level of at most about 100° C., e.g. from a normal temperature to 90° C. Whereas, the main press-bonding is preferably conducted usually at a temperature of from about 60° C. to a melting point of the thermoplastic resin, e.g. from about 80° to about 150° C. in the case where the thermoplastic resin is a polyurethane thermoplastic resin, under pressure of at least 2 kg/cm$^2$, e.g. from about 7 to 20 kg/cm$^2$ in the case of a polyurethane thermoplastic resin. These conditions may vary depending upon the types of the thermoplastic resin or the hard substrate, the thickness of size of each constituent unit or other factors.

The above-mentioned preliminary press-bonding is not restricted to the method of using a preliminary press-bonding envelope. For instance, it may be carried out by a method wherein the laminated assembly is passed through a pair of rolls to carry out the preliminary press-bonding by roll pressure, a method wherein the laminated assembly is pressed by a platen to carry out the preliminary press-bonding, or a double vacuum press-bonding method wherein the laminated assembly is placed in an inner reduced pressure chamber of a reduced pressure apparatus having double reduced pressure chambers, the outer reduced pressure chamber is firstly deaerated and then the inner reduced chamber is deaerated, and then the reduced pressure of the outer reduced pressure chamber is released, whereby press-bonding is carried out under atmospheric pressure. Likewise, the main press-bonding is not limited to the method of heat press-bonding by means of an autoclave, and may be conducted, for instance, by a method wherein the laminated assembly is pressed in a heated oil bath, a method wherein the laminated assembly is passed through a pair of rolls for pressing under heating, a method wherein the laminated assembly is pressed under heating or a method wherein the above-mentioned double vacuum press-bonding is carried out under heating. Further, in the heat press-bonding, particularly in the preliminary press-bonding step, it is preferred to use the above-mentioned mold material which is placed on the thermoplastic resin to ensure adequate press-bonding and to obtain a smooth surface and which is removed after the press-bonding. However, depending upon the purpose or the type of the press-bonding method, the use of such a mold method may be omitted. Further, the heat press-bonding of the thermoplastic resin with the hard substrate is conducted most commonly by way of the preliminary press-bonding step and the main press-bonding step. However, depending upon the conditions including the type of the heat press-bonding method, the type of the thermoplastic resin or the hard substrate, or the thickness or size of each constituent unit, the heat press-bonding can be conducted in a single step without necessity to cary out both steps of the preliminary press-bonding step and the main press-bonding step.

The lamination of the above-mentioned heat press-bonding is not only the process for the preparation of the laminated safety glass. However, such heat press-bonding has various advantages over other methods, such that a higher bonding strength between the thermoplastic resin and the hard substrate is obtainable, the thermoplastic resin can preliminarily formed into a sheet or film, whereby a smooth thermoplastic resin layer having good optical properties is obtainable, or the thermoplastic resin layer can be pressed with a mold material during the heat press-bonding, whereby a further improved smooth surface is obtainable. The laminated safety glass is preferably composed of a hard substrate and a thermoplastic resin layer having a single or multi-layered structure and contains no thermosetting resin layer between the hard substrate and the thermoplastic resin layer or between the layers of thermoplastic resin. However, in some cases, it may have a thin layer of a adhesive, a binder or other thermosetting resins. However, it does not have a thermoplastic resin layer at the exposed surface of the synthetic resin layer, as opposed to the case of the aforementioned prior art reference. Further, in the case where the hard substrate facing the synthetic resin layer is glass (inorganic glass), it is preferred that there is no thermosetting resin layer between the resin layer and the glass substrate.

The introduction of the above-mentioned cross-linkable groups and the subsequent cross-linking of the cross-linkable groups may be conducted at an optional stage during the process for the preparation of the laminated safety glass. For instance, at an early stage, it is possible to introduce and cross-link the cross-linkable groups in a surface which will eventually constitute the exposed surface of the laminated safety glass and then use such material for the preparation of the laminated safety glass of the present invention. At a later stage, it is possible to introduce and cross-link the cross-linkable groups to the exposed surface of the synthetic resin layer after the fabrication of laminated safety glass. The introduction and cross-linking of the cross-linkable groups are not necessarily conducted consecutively, and it is possible to interpose various steps between the two operations. For instance, it is possible to firstly introduce the cross-linkable groups into one side of a thermoplastic resin sheet or film, then to use it or to combine it with other synthetic resin for the lamination with a hard substrate by e.g. heat press-bonding to prepare laminated safety glass, and then to cross-link the cross-linkable groups present in the surface of the synthetic resin layer to obtain laminated safety glass of the present invention. More specifically, for instance, the above-mentioned compound having an epoxy group and an alkoxysilyl group, such as γ-glycidoxypropyltrimethoxysilane, is coated, by itself or in a form of a solution, on a carboxylic acid group-containing surface of the above-mentioned polyurethane thermoplastic resin sheet or film having carboxylic acid groups, on a synthetic resin laminate having such a sheet or film on its surface or on laminated safety glass having such layers, and it is reacted to introduce the alkoxysilyl group into the surface. Then, this alkoxysilyl group is cross-linked. In the case of the synthetic resin sheet or film, this cross-linking may be conducted after laminating it with a hard substrate. As mentioned above, the cross-linking of the alkoxysilyl group is carried out by hydrolysis of the alkoxysilyl group and dehydration condensation of the resulting silanol group. This two step reaction can be conducted separately. For instance, it is possible that a sheet or film of a synthetic resin having silanol groups formed by the hydrolysis of the alkoxysilyl groups, is laminated on a hard substrate and then the laminate is subjected to the dehydration condensation of the silanol groups. Likewise, it is possible that e.g. a compound having an epoxy group and a light-cross-linkable group (for instance, a cinnamic acid group) is reacted to the surface of a polyurethane thermoplastic resin having carboxylic acid groups, and light such as ultra-violet ray is irradiated to this light-cross-linkable group to obtain a surface having a cross-linked structure. Further, heat cross-linking may be conducted by a method wherein a compound having an isocyanate group or groups having active hydrogen are reacted under heating to a sheet or film of a thermoplastic polyurethane having hydroxyl groups, amino groups, urethane groups, or other groups having active hydrogen or isocyanate groups to carry out the cross-linking, or a method wherein a cross-linking agent such as a peroxide is used. In some cases, this heat cross-linking is preferably carried out simultaneously during the lamination of the thermoplastic polyurethane with a glass sheet.

Specific preferred processes for the production of the laminated safety glass of the present invention are generally classified into three methods.

Figure 5:
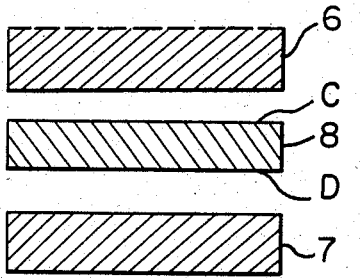
FIGS. 5 to 8 are cross-sectional views illustrating the processes for the preparation of various laminated structures for the laminated safety glass of the present invention.
Figure 7:
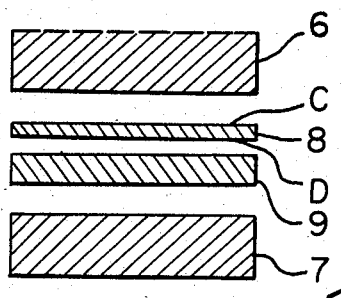
Figure 6:
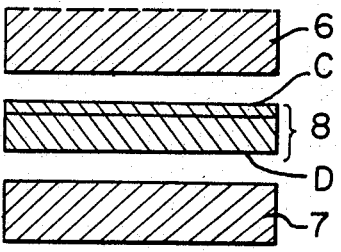
Figure 8:
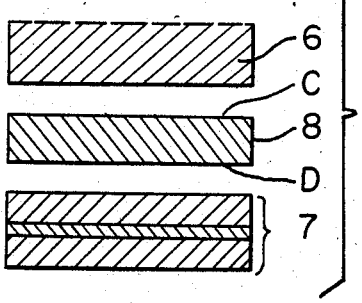

In the first method, a thermoplastic resin sheet or film having a preliminarily formed cross-linked structure on one side and a hard substrate are bonded by heat-pressing so that the surface of the sheet or film having no cross-linked structure constitutes the bonding surface. In this case, the lamination may be made by interposing a second thermoplastic resin sheet or film between the above-mentioned sheet or film and the hard substrate. For instance, laminated safety glass may be obtained by firstly introducing cross-linkable groups into one surface of a sheet or film of a polyurethane thermoplastic resin having carboxylic acid groups, then cross-linking the cross-linkable groups to obtain a polyurethane thermoplastic resin sheet or film having a cross-linked structure on one surface and no cross-linked structure on the other surface, and bonding by heat-pressing a glass sheet to the other surface of the polyurethane thermoplastic resin sheet or film. Instead of a single layered polyurethane thermoplastic resin sheet or film, a laminate of such a sheet or film with a sheet or film of further polyurethane thermoplastic resin having no carboxylic acid groups may be used. In such a case, the introduction and cross-linking of the cross-linkable groups in the surface containing carboxylic acid groups may be carried out prior to or after the lamination. FIGS. 5 to 8 is a schematic view illustrating this method. A thermoplastic resin sheet or film 8 having a cross-linked structure on one surface C and no cross-linked structure on the other surface D is placed between a mold material 6 and a hard substrate 7, and heat press-bonding is carried out to obtain laminated safety glass. FIG. 5 illutrates a case wherein a single layered thermoplastic resin sheet or film 8 is used, FIG. 6 illustrates a case wherein a two layered thermoplastic resin sheet or film 8 is used. And FIG. 7 illustrates a case wherein a second thermoplastic resin sheet or film 8 is interposed between the thermoplastic resin sheet or film 8 and the hard substrate 7. FIG. 8 illustrates a case wherein a laminated glass sheet having an intermediate film is used as the hard substrate.

In the second method, cross-linkable groups are introduced into one surface of a thermoplastic resin sheet or film, a hard substrate is bonded to the other surface of the sheet or film, and thereafter the cross-linkable groups are cross-linked. In some cases, the cross-linking of the cross-linkable groups may be conducted simultaneously with the heat press-bonding. The heat press-bonding may be conducted in the same manner as in the first method except that the heat press-bonding is carried out without preliminary cross-linking the cross-linkable groups. For instance, referring to FIGS. 5 to 8, the heat press-bonding is carried out by using a thermoplastic resin sheet or film having a surface containing cross-linkable groups instead of the surface C having a cross-linked structure, and the cross-linking of the cross-linkable groups is conducted after the heat press-bonding or at the same time as the heat press-bonding, to obtain laminated safety glass.

In the third method, after the preparation of laminated safety glass having a thermoplastic resin layer on one side, i.e. resin-laminated glass, cross-linkable groups are introduced in the exposed surface of the thermoplastic resin layer and then the cross-linkable groups are cross-linked. The preparation of the resin-laminated glass is preferably carried out by the above-mentioned heat press-bonding. Further, the thermoplastic resin constituting the exposed surface is preferably made of a polyurethane thermoplastic resin having carboxylic acid groups.

The transparent or translucent laminated safety glass obtained by the present invention is suitable for use as a window material for an automobile or other vehicle, or as window material for buildings. However, its use is not restricted to these specific examples, it may be used for various other applications where transparency and physical strength are required, for instance, for eye glasses.

Now, the present invention will be described in further detail with reference to a Reference Example and Examples. However, it should be understood that the present invention is by no means restricted to these specific Examples.

REFERENCE EXAMPLE

Polyurethane sheets were prepared in accordance with the following methods. The sheets thereby obtained are designated as Sheets A to E, and they were used in the subsequent Examples.

Sheet A 1500 g of polybutyleneadipate having a hydroxyl group value of 56 was dehydrated under vacuum of 3 mmHg at 110° C. for 2 hours. Added thereto are 908 g of isophorone diisocynate (3-isocyanate methyl-3,5,5-trimethylcyclohexyl isocyanate) and 0.16 g of di-n-butyltin dilaurate, and the mixture was reacted at 80° C. for 15 minutes under nitrogen stream. Then, 244 g of 1,4-butanediol and 75 g of dimethylol propionic acid were added to this reaction mixture, and the mixture was immediately stirred and mixed. As the reaction started, heat was generated, whereby a substantially uniform mixture was obtained. This liquid reaction mixture was poured into a vat coated with Teflon and reacted at 110° C. for 12 hours. The polymer thereby formed was pulverized by a pulverizer to obtain a granular product, which is then formed into a thermoplastic polyurethane sheet having a thickness of 0.6 mm by an extruder. This sheet was designated as Sheet A.

Sheet B

Sheet B having a thickness of 0.6 mm was prepared in the same manner as in the case of Sheet A by using 1500 g of polyethylene adipate having a hydroxyl group value of 56.7, 781 g of 4,4'-methylene-bis(cyclohexyl isocyanate), 0.45 g of di-n-butyltin dilaurate, 144 g of 1,4-butanediol and 75 g of dimethylolpropionic acid.

Sheet C

Sheet C having a thickness of 0.6 mm was prepared in the same manner as in the case of Sheet A by using 1500 g of polybutylene adipate having a hydroxyl group value of 54.3, 642 g of 4,4'-methylene-bis(cyclohexyl isocyanate), 0.33 g of di-n-butyltin dilaurate, 121 g of 1,4-butanediol and 45 g of dimethylolpropionic acid.

Sheet D

Sheet D having a thickness of 0.6 mm was prepared in the same manner as in the case of Sheet A by using 1500 g of polyethylene adipate having a hydroxyl group value of 56, 1173 g of 4,4'-methylene-bis(cyclohexyl isocyanate), 327 g of 1,4-butanediol and 0.18 g of di-n-butyltin dilaurate.

Sheet E

Sheet E having a thickness of 0.6 mm was prepared in the same manner as in the case of Sheet A by using 1500 g of polycaprolactonediol having a hydroxyl group value of 55.8, 1003 g of 4,4'-methylene-bis(cyclohexyl isocyanate), 0.33 g of di-n-butyltin dilaurate, 150 g of 1,4-butanediol and 75 g of dimethylol propionic acid.

EXAMPLE 1

A solution containing 50 g of glycidylcinnamate, 15 g of polyethyltriethylamine, 5 g of 2,2-dimethoxy-2-phenylacetophenone and 500 g of benzene, was uniformly coated on one surface of Sheet A, and reacted for 1 hour in a furnace purged with nitrogen and kept at 110° C. Then, light from a 100 W high pressure mercury lamp was irradiated to the surface treated with glycidylcinnamate, for 5 minutes from a distance of 5 cm. Thereafter, Sheet A was sandwiched between a pair of glass sheets. At that time, the surface of one of the glass sheets which was brought in contact with the light-treated surface of the Sheet A was preliminarily uniformly coated with polydimethyl siloxane and subjected to heat treatment at 350° C. This non-bonded glass laminate was put in a rubber envelope and the rubber envelope containing the laminate was placed in an autoclave. Firstly, both of the rubber envelope and the autoclave were vacuumed to remove an air between the glass sheets and Sheet A. Then, the autoclave was heated to 100° C., and while maintaining the vacuumed state in the rubber envelope, the pressure in the autoclave was returned to atmospheric pressure, whereby pressure of 1 kg/cm$^2$ was exerted. This condition was maintained for 15 minutes, and then autoclave was set at a temperature of 140° C. under pressure of 13 kg/cm$^2$ and maintained under these conditions for 20 minutes. The glass laminate was withdrawn from the autoclave, and then the glass sheet treated with polydimethylcycloxane was removed, whereby resin-laminated glass with the exposed surface of Sheet A being smooth like a glass surface and having good adhesion between the glass sheet and Sheet A was obtained.

The surface of Sheet A of this resin-laminated glass was subjected to a rubbing test with a felt cloth impregnated with each of ethanol/methanol=10/1 (V/V), carbon tetrachloride, kerosine and gasoline. No change was observed after rubbing the surface 1000 times. Further, in a Taber's abrasion resistance test according to JIS R-3212, an increase of the haze after the abrasion of 100 times was 2.5%. In a falling ball impact test according to the same JIS R-3212, the steel ball did not penetrate, thus indicating adequate penetration resistance.

Hereinafter, the above-mentioned testing methods are referred to as a rubbing test, a Taber's test and a falling ball test, respectively, and the results of the respective tests in each Example will be shown.

EXAMPLE 2

A solution comprising 50 g of glycidyl methacrylate, 15 g of N,N'-dimethylaniline, 5 g of benzoinmethylether and 500 g of benzene, was uniformly coated on one surface of Sheet B, and reacted for 30 minutes in a furnace purged with nitrogen and kept at 110° C. Then, in the same manner as in Example 1, irradiation was carried out, and then the Sheet B was laminated with a glass sheet to obtain resin-laminated glass.

This resin-laminated glass was subjected to the tests, and the results thereby obtained were as follows:

| Rubbing test | No change |
|---|---|
| Taber's test | Haze increase of 2.3% |
| Falling ball test | No penetration |

EXAMPLE 3

A mixture of γ-glycidoxy propyltrimethoxysilane and a trace amount of N,N-dimethylaniline was extremely thinly and uniformly coated on one side of Sheet C, and reacted at a temperature of 110° C. for 30 minutes in a furnace purged with nitrogen. This Sheet C was immersed for 30 minutes in hot water of 90° C., and then dried in a drier at 120° C. for 15 minutes. Thereafter, in the same manner as in Example 1, resin-laminated glass was prepared. The surface of Sheet C of this resin-laminated glass was smooth like a glass surface and had no optical distortion. Further, the adhesion of Sheet C with glass was excellent.

| Rubbing test | No change |
|---|---|
| Taber's test | Haze increase of 2.0% |
| Falling ball test | No penetration |

EXAMPLE 4

A solution comprising 50 g of γ-isocyanate propyltrimethoxy silane, 0.5 g of lead octylate and 500 g of benzene was uniformly coated on one surface of Sheet D, and reacted at a temperature of 110° C. for 1 hour in a furnace purged with nitrogen. With this sheet, resin-laminated glass was prepared in the same manner as in Example 3.

| Rubbing test | No change |
|---|---|
| Taber's test | Haze increase of 2.4% |
| Falling ball test | No penetration |

EXAMPLE 5

In Example 1, Sheet A treated on one surface with glycidyl cinnamate was laminated with a glass sheet in the same manner as in Example 1 without irradiation, whereby resin-laminated glass having a polyurethane sheet layer with its surface non-cross-linked. This polyurethane sheet layer was smooth like a glass surface and its adhesion with the glass sheet was excellent.

Then, light from a 100 W high pressure mercury lamp was irradiated to the surface of Sheet A of this resin-laminated glass from a distance of 5 cm for 5 minutes. The physical properties of the surface of the Sheet A thus cross-linked by irradiation and the penetration resistance of this resin-laminated glass were as follows.

| Rubbing test | No change |
|---|---|
| Taber's test | Haze increase of 2.6% |
| Falling ball test | No penetration |

EXAMPLE 6

Sheet B prepared in Example 2 and having non-cross-linked light-cross-linkable groups on one surface was laminated in the same manner as in Example 1 without irradiation, whereby resin-laminated glass was prepared. Then, irradiation was carried out in the same manner as in Example 5, whereby resin-laminated glass having a cross-linked surface was obtained.

| Rubbing test | No change |
|---|---|
| Taber's test | Haze increase of 2.3% |
| Falling ball test | No penetration |

EXAMPLE 7

A mixture of γ-glycidoxy propyltrimethoxysilane and a trace amount of N,N-dimethylaniline was thinly and uniformly coated on one surface of Sheet C, and subjected to heat treatment at 110° C. for 30 minutes in a furnace purged with nitrogen. This surface-treated Sheet C was laminated with a glass sheet in the same manner as in Example 1 to obtain resin-laminated glass.

Then, this resin-laminated glass was immersed for 30 minutes in hot water of 90° C., and then dried in a drier at 120° C. for 15 minutes. The film surface of this resin-laminated glass was smooth, and the adhesion of the film with the glass sheet was excellent.

| Rubbing test | No change |
|---|---|
| Taber's test | Haze increase of 2.0% |
| Falling ball test | No penetration |

EXAMPLE 8

Resin-laminated glass was prepared in the same manner as in Example 7 except that instead of γ-glycidoxy propyltrimethoxysilane in Example 7, β-(3,4-epoxycyclohexyl)ethyltrimethoxysilane was used. Thereafter, hot water treatment and drying were carried out in the same manner, whereby satisfactory resin-laminated glass was obtained.

| Rubbing test | No change |
|---|---|
| Taber's test | Haze increase of 2.6% |
| Falling ball test | No penetration |

EXAMPLE 9

Resin-laminated glass having the thermoplastic polyurethane layer having a moisture-cross-linked surface was prepared in the same manner as Example 7 except that Sheet E was used.

| Rubbing test | No change |
|---|---|
| Taber's test | Haze increase of 2.9% |
| Falling ball test | No penetration |

EXAMPLE 10

Resin-laminated glass was prepared in accordance with the lamination method of Example 1 without applying surface treatment to Sheet A. (Resin-laminated glass prepared by laminating a sheet with no surface treatment and glass will be hereinafter referred to as "non-treated resin-laminated glass".) The thermoplastic polyurethane layer of this resin-laminated glass was firmly bonded to the glass sheet, and its exposed surface was smooth.

Then, a solution comprising 50 g of γ-glycidoxy propyltrimethoxysilane, 0.5 g of N,N'-dimethylaniline and 500 g of n-hexane was uniformly coated on the exposed surface of the polyurethane sheet of this non-treated resin-laminated glass, and reacted at a temperature of 110° C. for 30 minutes in a nitrogen atmosphere. Thereafter, the resin-laminated glass was immersed in hot water at 90° C. for 30 minutes, and then dried in a drier at 126° C. for 20 minutes. The polyurethane sheet surface of this resin-laminated glass was smooth like a glass surface, and the resin-laminated glass was also optically excellent.

| Rubbing test | No change |
| Taber's test | Haze increase of 2.5% |
| Falling ball test | No penetration |

The above-mentioned non-treated resin-laminated glass was subjected to a rubbing test, whereby the surface was impaired when subjected to rubbing with an ethanol/methanol mixed solution, and its haze increase was 30%.

EXAMPLE 11

With use of Sheet E, non-treated resin-laminated glass was prepared in the same manner as in Example 10. Then, it was treated in the same manner as in Example 1, whereby surface-treated excellent resin-laminated glass was obtained.

| Rubbing test | No change |
| Taber's test | Haze increase of 2.9% |
| Falling ball test | No penetration |

EXAMPLE 12

A solution comprising 50 g of glycidyl methacrylate, 0.5 g of N,N'-dimethylaniline, 5 g of benzoinmethylether and 500 g of benzene was uniformly coated on the polyurethane sheet surface of the non-treated resin-laminated glass of Example 10, and reacted at a temperature of 110° C. for 30 minutes in a nitrogen atmosphere. Thereafter, light from a 100 W high pressure mercury lamp was irradiated to the polyurethane sheet surface of this resin-laminated glass for 10 minutes, whereby surface treated excellent resin-laminated glass was obtained.

| Rubbing test | No change |
| Taber's test | Haze increase of 2.6% |
| Falling ball test | No penetration |

EXAMPLE 13

With use of Sheet D, non-treated resin-laminated glass was prepared. A solution comprising 50 g of γ-isocyanate propyltrimethoxy-silane, 0.5 g of octylic acid and 500 g of benzene was uniformly coated on the polyurethane sheet surface of this non-treated resin-laminated glass, and reacted at a temperature of 110° C. for 1 hour in a nitrogen atmosphere. Thereafter, it was immersed in hot water at 90° C. for 30 minutes and then dried at 120° C. for 20 minutes, whereby surface-treated excellent resin-laminated glass was obtained.

| Rubbing test | No change |
| Taber's test | Haze increase of 2.4% |
| Falling ball test | No penetration |

EXAMPLE 14

Surface-treated excellent resin-laminated glass was obtained in the same manner as in Example 12 except that instead of glycidyl methacrylate, glycidylcinnamate was used.

| Rubbing test | No change |
| Taber's test | Haze increase of 2.8% |
| Falling ball test | No penetration |

EXAMPLE 15

A sheet having a thickness of 0.6 mm was prepared in the same manner as in the case of Sheet A except that 1500 g of poly(butyleneadipate) having a hydroxyl group value of 54.1, 148 g of 1,4-butane diol, 75 g of dimethylol propionic acid and 0.45 g of di-n-butyltindilaurate were used.

Then, with use of this sheet, resin-laminated glass was prepared by the same lamination method as in Example 1. In this case, however, a solution comprising 50 g of 1,4-butane diol, 0.5 g of N,N'-dimethylaniline and 100 g of tetrahydrofuran was uniformly coated on the sheet surface treated with polydimethylsiloxane and which is in contact with glass, and dried in an air. The surface of the thermoplastic polyurethane layer of the surface-treated resin-laminated glass thus obtained was smooth, and the resin-laminated glass was optically excellent.

| Rubbing test | No change |
| Taber's test | Haze increase of 2.4% |
| Falling ball test | No penetration |

EXAMPLE 16

Excellent resin-laminated glass was prepared in the same manner as in Example 15 except that 1500 g of polybutylene adipate having a hydroxyl group value of 54.1, 798 g of 4,4'-methylenebis(cyclohexylisocyanate), 127 g of 1,4-butane diol, 75 g of cis-1,4-butene-2-diol and 0.15 g of di-n-butyltindilaurate were used and 2,5-dimethyl-2,5-di-t-butylperoxyhexane was uniformly coated as a treating agent to the sheet surface.

| Rubbing test | No change |
| Taber's test | Haze increase of 2.5% |
| Falling ball test | No penetration |

We claim:
1. A transparent or translucent laminated safety glass having an at least two layered structure, comprising: a polyurethane thermoplastic resin layer deposited on a hard substance, the exposed surface of said polyurethane resin layer having a cross-linked structure which is formed by the light or moisture initiated cross-linking of cross-linkable functional groups, the resin of said exposed surface containing carboxylic acid groups.
2. The laminated safety glass of claim 1, wherein the cross-linkable functional groups are introduced into the exposed surface of said thermoplastic resin layer by reacting the carboxylic acid groups which are within the polyurethane resin on the exposed surface of said layer with a compound which contains cross-linkable groups and epoxy groups.

3. The laminated safety glass of claim 2, wherein the cross-linkable functional groups in said compound which reacts with the carboxylic acid groups in said polyurethane resin are initiated in their cross-linking reaction by light or moisture.

4. The laminated safety glass of claim 3, wherein said compound containing epoxy groups and light initiated, cross-linkable functional groups is at least one compound selected from the group consisting of glycidoxy cinnamate, glycidoxy acrylate and glycidoxy methacrylate.

5. The laminated safety glass of claim 3, wherein said compound containing epoxy groups and moisture initiated, cross-linkable functional groups is glycidoxy alkyltrialkoxysilane.

6. The laminated safety glass of claim 1, wherein said hard substrate is a layer of inorganic glass.

7. The laminated safety glass of claim 1, wherein said hard substrate is a laminate of a pair of inorganic glass sheets having an intermediate film interposed between the two glass sheets.

8. A transparent or translucent laminated safety glass having an at least two layered structure, comprising:
a polyurethane thermoplastic resin layer deposited on a hard substrate, the exposed surface of said polyurethane resin layer having a cross-linked structure which is formed by the light initiated cross-linking of cross-linkable functional groups selected from the group consisting of cinnamic acid groups, acrylic acid groups, methacrylic acid groups and combinations thereof.

9. The laminated safety glass of claim 2, wherein said hard substrate is a layer of inorganic glass.

10. The laminated safety glass of claim 2, wherein said hard substrate is a laminate of a pair of inorganic glass sheets having an intermediate film interposed between the two glass sheets.

11. A transparent or translucent laminated safety glass having an at least two layered structure, comprising:
a polyurethane thermoplastic resin layer deposited on a hard substrate, the exposed surface of said polyurethane resin layer having a cross-linked structure which is formed by the moisture initiated cross-linking of cross-linkable alkoxysilyl functional groups.

12. The laminated safety glass of claim 11, wherein said hard substrate is a layer of inorganic glass.

13. The laminated safety glass of claim 11, wherein said hard substrate is a laminate of a pair of inorganic glass sheets having an intermediate film interposed between the two glass sheets.

* * * * *